United States Patent [19]

Traise

[11] 4,061,527

[45] Dec. 6, 1977

[54] APPARATUS FOR APPLYING PATCHES TO A CONTINUOUS WEB

[75] Inventor: John E. Traise, Niagara Falls, N.Y.

[73] Assignee: Moore Business Forms, Inc., Niagara Falls, N.Y.

[21] Appl. No.: 786,775

[22] Filed: Apr. 12, 1977

[51] Int. Cl.[2] .......... B32B 31/00; B31B 1/00

[52] U.S. Cl. .......... 156/519; 93/61 A

[58] Field of Search .......... 156/510, 519, 521, 108; 93/61 A

[56] References Cited

U.S. PATENT DOCUMENTS

| | | | |
|---|---|---|---|
| 3,431,830 | 3/1969 | Stovall | 93/61 A |
| 3,450,009 | 6/1969 | Dohnalik | 93/61 A |
| 3,468,227 | 9/1969 | Volks et al. | 93/61 A |
| 3,630,124 | 12/1971 | Sauerman | 93/61 A |
| 3,630,125 | 12/1971 | Helm | 93/61 A |
| 3,683,756 | 8/1972 | Wilson | 93/63 R |
| 3,745,893 | 7/1973 | Helm | 156/521 |
| 3,801,394 | 4/1974 | Alexander et al. | 93/61 A |
| 3,853,041 | 12/1974 | Lynas | 93/61 A |
| 3,869,964 | 3/1975 | Kranz | 93/61 A |
| 3,869,965 | 3/1975 | Howatt | 93/61 A |
| 3,887,414 | 6/1975 | Cohn | 156/521 |
| 3,894,905 | 7/1975 | Ehlscheid | 93/61 A |

*Primary Examiner*—Douglas J. Drummond

[57] ABSTRACT

An apparatus is provided for the application of patches or other sheets of material to a moving continuous web after adhesive is applied to selected portions thereof. The patches are burst from a web of patch material along spaced cross lines of perforations, and are transferred on to the moving web so as to overlie the adhesive thereon. Two pair of spaced rolls rotatable at relatively different speeds effect bursting, with one of such pair of rolls functioning to both meter the web of patch material and to apply the cross lines of perforations. One of the other pair of rolls serves to transfer the patches on to the moving web by means of air chambers first subjected to vacuum pressure for retaining the patches on to the circumferential surface of such roll, and thereafter subjected to positive air pressure for depositing the patches in place on the moving web.

6 Claims, 4 Drawing Figures

APPARATUS FOR APPLYING PATCHES TO A CONTINUOUS WEB

BACKGROUND OF THE INVENTION

This invention relates generally to an apparatus for applying patches to a moving continuous web, and more particularly to such an apparatus wherein a web of patch material is capable of being cross-perforated, burst into individual patches and transferred on to the moving web all in synchronization with the moving web.

U.S. Pat. No. 3,745,893 discloses an apparatus for applying patches to envelope blanks which are individually transferred to a patch severing and applying station. Adhesive is applied at such station to a web of patch material after which the web is severed and is transferred on to the blanks by means of a vacuum transfer roll.

U.S. Pat. No. 3,468,227 discloses an envelope blank forming machine wherein adhesive is applied to precut envelope blanks, and a web of patch material is severed and applied to the adhesive on the blanks.

U.S. Pat. No. 3,630,124 discloses an apparatus for applying window patches to precut envelope blanks wherein a web of patch material has adhesive applied thereto, is subsequently partially severed and is advanced over a transfer roll where bursting takes place as spaced fingers engage successive patches to complete the severing thereof. The individual patches are then transferred on to the precut envelope blanks.

Difficulties arise in controlling the transfer of the individual patches on to the precut blanks, especially at high operating speeds, when using those prior art machines wherein the web of patch material is completely severed into individual patches (the '893 and the '227 patents) as well as with the use of the machine disclosed in the '124 patent wherein the web of patch material is partially severed and subsequently burst into individual patches. Besides, the synchronization between the moving precut blanks and the cutting, bursting (where applied) and transferring of the patches thereto is difficult to maintain in these prior art arrangements.

SUMMARY OF THE INVENTION

It is therefore an object of the present invention to provide an apparatus for applying patches to a continuous web which apparatus avoids the limitations of the prior art and which operates in a more efficient, effective and economical manner.

A further object of the present invention is to provide such an apparatus as having a combined perforating, bursting and patch transfer means wherein the patches are maintained under complete control during operation of the apparatus. Such a means as herein used is driven synchronously with the moving web.

The present apparatus makes use of two pairs of spaced rolls wherein a first pair serves to meter and perforate the web of patch material. The bursting operation is carried out as the two pairs of rolls are respectively rotated at low and high rates of speed. Also, a roll of the second higher speed pair of rolls serves to transfer individual patches upon bursting on to adhesive which has already been applied to selected portions of the moving web. The ratio between the low speed and high speed rolls may be varied to suit the corresponding ratio between patch depth and repeat depth of the moving web. A train of two adhesive rolls are synchronously driven with the moving web for applying adhesive at the selected portions of the moving web. And, the roll sizes of the two pair of rolls may be changed to effect the changeover to any reasonable web repeat depth and patch depth.

DETAILED DESCRIPTION OF THE INVENTION

Figure 1:
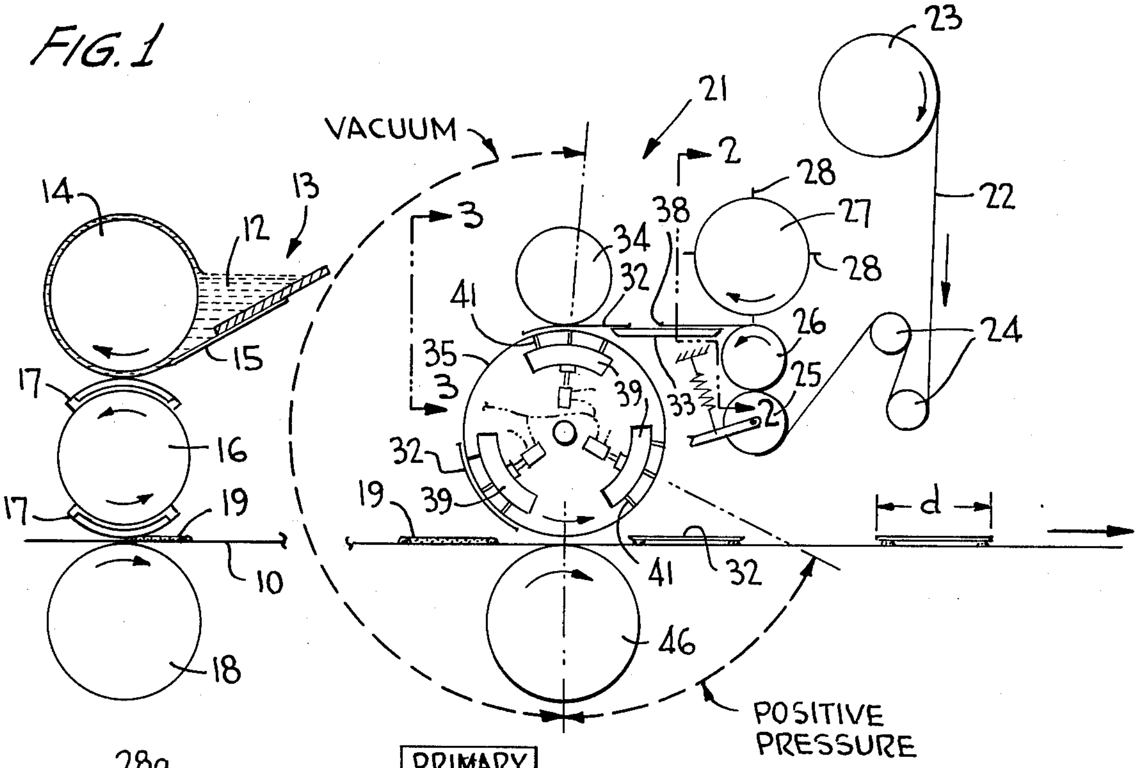
FIG. 1 is a schematic illustration in end elevation of the apparatus according to the invention.
Figure 4:
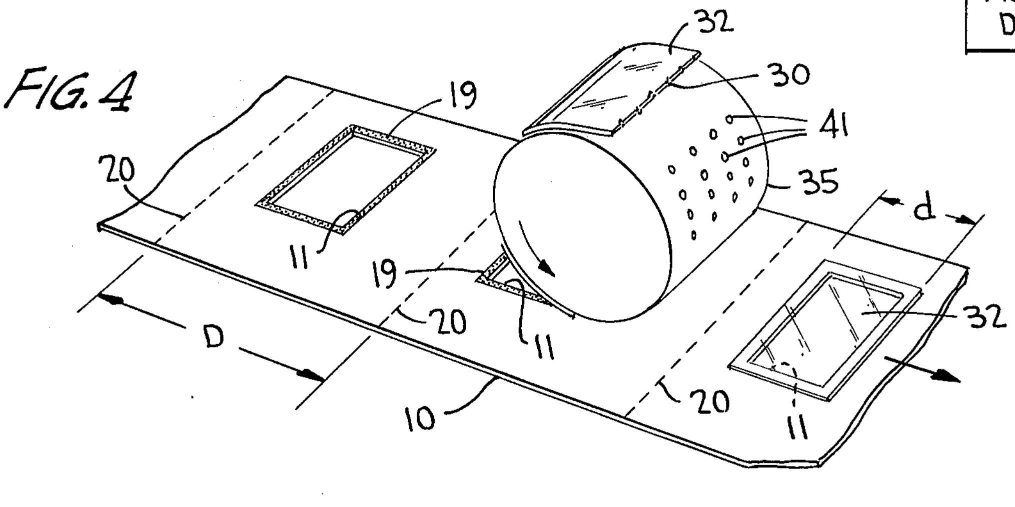
FIG. 4 is a perspective view of the transfer roll of the FIG. 1 apparatus illustrating the manner of transferring individual patches on to the moving web.

Turning now to the drawings wherein like reference characters refer to like and corresponding parts throughout the several views, a moving web 10, having diecut openings 11 regularly spaced therein, advances in the direction of the arrow of FIGS. 1 and 4 at press speed, if made part of a printing press operation, or at the speed of collating if the web is processed during a collating operation. Cold adhesive 12 contained within a fountain 13 is picked up by a roll 14 having a smooth surface and is doctored to a required thickness by means of a rigid doctor blade 15. A plate cylinder 16 is provided with one or more elastomeric plates 17 which are patterned to suit the diecut openings on the web. As adhesive 12 is transferred from roll 14 to plates 17 then to web 10, a perimeter 19 of adhesive is stencilled around each web diecut opening as the web is pressured between plate cylinder 16 and an impression cylinder 18. It can be therefore seen that, just prior to the patch applying operation to be hereinafter described, the web is stencilled with suitable adhesive as at 19 around each diecut opening for bonding the perimeter of the patches in place. For such purpose a two-roll adhesive train of rolls is utilized as including a smooth pickup roll and a rigid fixed-gap doctor blade to extrude a given adhesive thickness on to the roll, where it is picked up by a conventional rubber or photo-polymer plate, and then "printed" on to the web. Typically, to provide a 2 mil wet adhesive thickness on the web, plates 17 should carry a three to four mil thickness of adhesive, which in turn is obtainable by a 5 to 8 mil thick adhesive film on the pickup roll. This latter setting is used on the fixed doctor blade gap.

Figure 2:
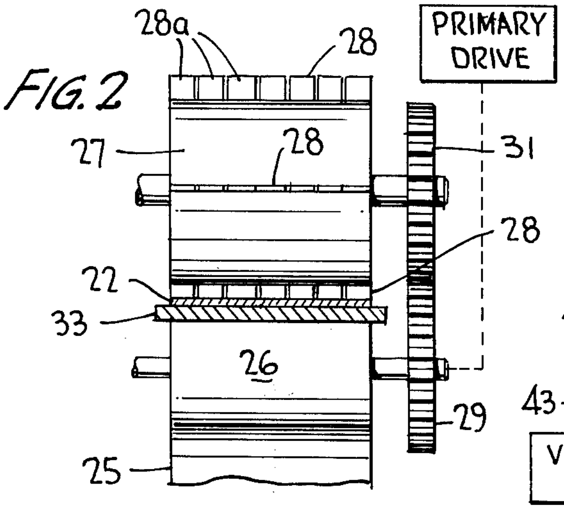
FIGS. 2 and 3 are elevational views of portions of the apparatus taken respectively along lines 2—2 and 3—3 of FIG. 1.

The patch forming and transfer apparatus of the invention is generally designated 21 in FIG. 1 and is designed to apply window patches to web 10 in synchronization with its movement. A continuous web 22 of window film such as glassine (or other media to be affixed) is moved in the direction of the arrow shown in FIG. 1 from its supply roll 23 and about tensioning bars 24, then about a spring loaded roll 25 and further through the nip between such roll and a metering roll 26. This roll 26 is gear coupled to the primary drive system, shown in block diagram in FIG. 2, for advancing web 10, so as to draw a given length of web 22 material from its supply roll 23. As roll 26 rotates in the direction of its arrow as shown, web 22 advances between this roll and a perforation roll or cylinder 27 having a plurality of equally spaced cutting blades 28 extending radially outwardly of the circumferential surface of cylinder 27 and each comprising a series of slightly spaced cutting blades 28a as shown in FIG. 2 so as to provide a transverse line of perforations 30 (FIG. 4) in web 22. Roll 26 and cylinder 27 are gear coupled together as a cooperating pair of rolls by means of gearing 29 and 31. Therefore, as web 22 passes through the nip between rolls 26 and 27, it is transversely perforated at a regular spacing in accordance with the diameter of roll 27 and the number of blades 28 used. For example, a 6 inch circumferential dimension of roll 27 having four sets of blades 28 spaced at 90° will provide a 1½ inch repeat depth *d* of perforation spacings so as to effect a depth *d* for each individual patch 32 which is burst.

Figure 3:
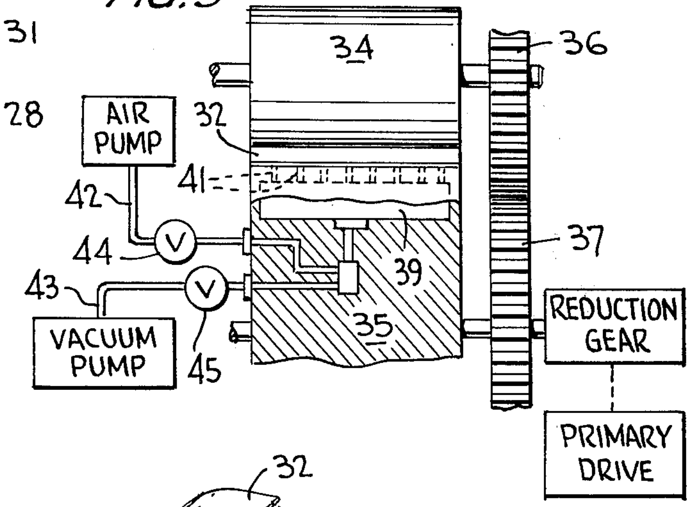

Window web 22 then advances over a support 33 to a high speed roll pair 34 and 35 which are also gear coupled together as by gearing 36 and 37 shown in FIG. 3, and are synchronously driven by the primary drive provided for web 10. Roll pair 34 and 35 are, however, driven through gearing at a higher feed web displacement rate relative to the rate at which roll pair 26 and 27 are driven. Hence, whenever a leading edge 38 is nipped between rolls 34 and 35, these high speed rolls accelerate the web which is contained by low speed rolls 26 and 27 so as to burst or separate an individual patch 32 from web 22 along a cross line of weakening provided by one of the blades 28. Continued bursting of web 22 into individual patches is likewise effected as new leading edges 38 advance into the nip between high speed rolls 34 and 35. The nips between the high speed and low speed roll pairs are linearly spaced apart a distance greater than one perforation repeat depth *d* but less than two perforation repeat depths *d* in order to permit the bursting of one individual patch at a time.

Roll 35 is designed to transfer individual patches 32 on to adhesive patterns 19 from the time they are burst from continuous web 22. Roll 35 has mounted therein a plurality of equally spaced air chambers 39 having air passages 41 extending from each air chamber and outwardly through the circumferential surface of roll 35. A vacuum pump, shown in block diagram in FIG. 3, is connected to each of the air chambers through a line 42, and a vacuum pump, shown in block diagram in FIG. 3, is likewise connected to each of the air chambers but through a line 43, with both lines being gated or valved in some normal fashion as at 44 and 45. Hence, upon actuation of the vacuum pump, those patches 32 which overlie air passages 41 are thereby retained in place on the circumferential surface of roll 35 for transferring them from the nip between rolls 34 and 35 to the gap between roll 35 and its support roll 46. The vacuum pump is actuated for such purpose only while the individual patches are so retained during their path of travel between these two nip points, such path being designated as VACUUM in FIG. 1. Thereafter, as a leading edge of the path reaches the gap between rolls 35 and 46, the vacuum pump associated with that particular air chamber is cut off and the air pump is actuated to apply positive pressure through air passages 41 of that particular air chamber. Accordingly, the individual window patch is positively deposited from the circumferential surface of roll 35 so as to overlie adhesive stencilling 19 as the window patch moves beyond the nip of rolls 35, 46. This positive pressure from the air pump is maintained throughout an arc illustrated in FIG. 1 as POSITIVE PRESSURE so as to assure that patch 32 will be positively deposited in place on the web.

The circumferential speed of roll 35 must be matched to the speed of web 10, and the circumferential dimension of roll 35 must be some multiple of web repeat depth D (delimited by transverse lines 20 of weakening defining interconnected forms) to effect correct spacing of the patches 32 on web 10. This geometry is easily accomplished by matching the diameter of roll 35 to web repeat depth D and adjusting the gear ratio between roll pairs 26, 27 and 34, 35.

It should be pointed out that the concept of utilizing rotating pairs of high speed and low speed rolls to effect bursting of a continuous web having spaced weakened lines, is known in the prior art. The apparatus according to the invention is, however, regarded as a special application of such principle, in combination with a perforating mechanism on the low speed rolls of the detacher, and further in combination with a patch transfer mechanism on the high speed rolls. A two-roll rigid doctor blade extruding applicator applies adhesive to the moving continuous web at selected spaced locations therealong surrounding diecut openings already provided in the web. With the present invention, individual window patches are applied to the web at printing press speeds when the present patch applying apparatus is combined with a printing press which functions to print, punch marginal feed holes, and perforate the web at spaced transverse locations, at typical web press speeds, in one operation. The present apparatus may be combined with a collator where additional features of the finished product are required. In any event, the window patches are applied to web 10 at either press or collator co-operation depending on how the present apparatus is used.

While the present apparatus is designed for the application of transparent or translucent window patches over the diecut openings provided in a continuous moving web, the apparatus may likewise be used in applying address labels, individual cards, "tip-ons," etc., to a moving continuous web without departing from the scope of the invention, by making the necessary dimensional changes to the appropriate rolls and drive mechanisms.

The low speed roll pair of the apparatus, in addition to providing a "nip" hold for the web being burst, is also designed as a web perforating cylinder for applying spaced transverse perforations to the patch film being processed. This web perforation cylinder is synchronously driven from the press (or collator), and perforations so placed on the web of patch material are then timed to corresponding diecut windows on web 10 with which it is operative.

The high speed roll pair, in addition to providing a web "nip" of the web when the leading edge thereof for bursting enters such nip, also is provided with a rotary vacuum chamber means which is gated to receive patches at the time they are detached to thereby hold them for some fixed arc of rotation of roll 35, where roll 35, with patches so secured, meets web 10 in synchronization of the diecut window openings. At this rotary position, the vacuum chamber which holds a window patch transfers and the chamber is placed under positive gauge pressure to effect release of the patch coincident with each patch meeting web 10 at the correct position.

Just prior to the aforedescribed operation, web 10 is stencilled with suitable adhesive around the diecut openings for bonding the perimeter of the transparent patches in place.

The apparatus according to the invention is easy to assemble, simple to operate, economical in its manufacture and use, and operates with a minimum number of moving parts in applying individual patches to a moving continuous web with complete control of the patches during bursting and application.

Obviously, many modifications and variations of the invention are made possible in the light of the above teachings. It is therefore to be understood that within the scope of the appended claims the invention may be practiced otherwise than as specifically described.

What is claimed is:

1. Apparatus for the application of patches to a moving continuous web, comprises:
- means for applying adhesive to selected portions of the moving continuous web at predetermined distances apart;
- means for perforating a web of patch material along transverse lines spaced predetermined distances apart, said perforating means including a pair of first rolls rotatable at a first rate of speed, one of said first rolls having cutting blades thereon;
- means for bursting said web of patch material into individual patches along said spaced lines, said bursting means including a pair of second rolls rotatable at a second rate of speed higher than said first rate of speed; and
- means for transferring said patches on to said moving continuous web so as to overlie said selected portions thereof, said transferring means including one of said second rolls provided with means for retaining said patches on the circumferential surface of said one second roll and depositing each of said retained patches on to said moving continuous web in overlying relationship with said selected portions.

2. The apparatus according to claim 1, wherein the roll axes of said first rolls are spaced from the roll axes of said second rolls a distance greater than said predetermined distance and less than twice said predetermined distance so as to prevent bursting of more than a single patch at a time.

3. The apparatus according to claim 1, wherein said means for retaining and depositing includes air chambers located within said one second roll and radially spaced apart a circumferential distance equal to said predetermined distance between said selected portions, air passageways in said chambers and in said circumferential surface overlying said chambers, vacuum means connected to said air chambers for retaining said patches on said circumference over said chamber passageways as said chambers move with rotation of said one second roll from the other of said second roll to said moving web, and air pressure means connected to said air chambers for depositing said retained patches on to said selected portions as said chambers move with rotation of said one second roll away from said moving web and toward said other second roll.

4. Apparatus for applying patches to a longitudinally moving continuous web having spaced transverse lines of weakening therein defining interconnected forms, comprising:
- means for applying adhesive to portions of said forms at equally spaced distances;
- means including a pair of first rolls rotatable at a first rate of speed for metering said web of patch material by passage thereof through the nip between said first rolls;
- means on one of said rolls for providing spaced transverse lines of weakening in said web of patch material upon passage thereof through said nip;
- means including a pair of second rolls rotatable at a second rate of speed greater than said first rate for separating said web of patch material into individual patches along said transverse lines thereof as a leading end of said patch material web moves between the nip of said second rolls; and
- means including one of said second rolls for transferring said individual patches, while lying spaced apart on the circumferential surface thereof, from said nip between said second pair of rolls and on to said adhesive at said selected portions.

5. The apparatus according to claim 4, wherein said nips between said first and second pairs of rolls are spaced apart a distance greater than the spacing between said lines of weakening provided in said web of patch material, but less than twice said spacing.

6. The apparatus according to claim 4, wherein said means for transferring comprises said one second roll having mounted therein a plurality of air chambers radially spaced apart circumferential distances equal to the spacing between said portions of said forms, air passages in said circumferential surface communicating with said chambers, vacuum means connected to said chambers for retaining said patches overlying said chambers while said patches moves from said nip between said second rolls to said moving web, and positive pressure means connected to said chambers for depositing said patches on to said adhesive at said selected portions while said chambers move from said moving web toward said nip between said second rolls.

* * * * *